US009255369B2

(12) United States Patent
Spataro et al.

(10) Patent No.: US 9,255,369 B2
(45) Date of Patent: Feb. 9, 2016

(54) COLLAPSABLE SHOVEL HANDLE

(71) Applicants: Joe Spataro, Cottonwood Heights, UT (US); Jake Hall, Highland, UT (US); Thomas Laakso, Park City, UT (US)

(72) Inventors: Joe Spataro, Cottonwood Heights, UT (US); Jake Hall, Highland, UT (US); Thomas Laakso, Park City, UT (US)

(73) Assignee: Black Diamond Equipment, Ltd., Salt Lake City, UT (US)

( * ) Notice: Subject to any disclaimer, the term of this patent is extended or adjusted under 35 U.S.C. 154(b) by 0 days.

(21) Appl. No.: 14/525,260

(22) Filed: Oct. 28, 2014

(65) Prior Publication Data

US 2015/0123413 A1 May 7, 2015

Related U.S. Application Data

(60) Provisional application No. 61/898,520, filed on Nov. 1, 2013.

(51) Int. Cl.

| | |
|---|---|
| ***A01B 1/02*** | (2006.01) |
| ***A01B 1/22*** | (2006.01) |
| ***E01H 5/02*** | (2006.01) |
| ***E01H 5/06*** | (2006.01) |
| ***B25F 1/02*** | (2006.01) |
| ***B25G 1/04*** | (2006.01) |
| ***B25G 1/06*** | (2006.01) |

(52) U.S. Cl.
CPC .. *E01H 5/02* (2013.01); *B25F 1/02* (2013.01); *B25G 1/04* (2013.01); *B25G 1/06* (2013.01); *E01H 5/061* (2013.01); *Y10T 29/49716* (2015.01)

(58) Field of Classification Search
CPC .............. B25G 3/04; B25G 1/04; B25G 3/12; B25G 3/26; B25G 1/06; Y10T 29/49963; Y10T 403/7075; Y10T 29/537; Y10T 29/49716; B25F 1/02; E01H 5/02; E01H 5/061
USPC ...................................................... 294/51, 57
See application file for complete search history.

(56) References Cited

U.S. PATENT DOCUMENTS

| | | | | | |
|---|---|---|---|---|---|
| 2,047,485 | A * | 7/1936 | McBrady | ........................ | 294/57 |
| 5,533,768 | A * | 7/1996 | Mitchell | ...................... | 294/54.5 |
| 5,795,000 | A * | 8/1998 | Aldorasi | ......................... | 294/57 |
| 6,003,915 | A * | 12/1999 | Bierman | ......................... | 294/51 |
| 6,412,843 | B1 * | 7/2002 | Burbrink et al. | ................ | 294/57 |
| 7,571,945 | B2 * | 8/2009 | Walker et al. | ................... | 294/51 |
| 2008/0179904 | A1 * | 7/2008 | Huang | ........................... | 294/51 |

* cited by examiner

*Primary Examiner* — Stephen Vu
(74) *Attorney, Agent, or Firm* — Trent Baker; Baker & Associates PLLC

(57) ABSTRACT

One embodiment relates to a snow shovel system with an extended and collapsed state. The system includes a blade member, handle, lower shaft member, and upper shaft member. One end of the lower shaft member is coupled to the blade member and the other is slidably coupled with the upper shaft member. A first end of the upper shaft member is coupled to a handle and the second end is slidably coupled with the lower shaft member. The slidable coupling between the lower and upper shaft members includes an extended state and a collapsed state in which the handle is separated from the blade member a greater distance in the extended state. The collapsed state includes translating a portion of the lower shaft member beyond the first end of the upper shaft member.

20 Claims, 5 Drawing Sheets

COLLAPSABLE SHOVEL HANDLE

RELATED APPLICATIONS

This application claims priority to U.S. provisional application Ser. No. 61/898,520 filed Nov. 1, 2013, the contents of which are incorporated by reference.

FIELD OF THE INVENTION

The invention generally relates to portable snow shovel systems. In particular, the present invention relates to an improved collapsing system for snow shovel systems.

BACKGROUND OF THE INVENTION

Shovels are used for moving materials from one location to another. A shovel has the ability to quickly displace material without requiring the user to touch that material. A quantity of material is generally scooped up by a shovel and then released in a different location. Shovels can be used to displace a wide variety of materials including dirt, snow, etc.

Shovels include two primary components, a blade and a shaft. The blade is the shovel component in which the material is gathered. Blades are often concave or rounded to facilitate retaining loose materials. The shaft is made of one or more elongated members which extend away from the blade a particular amount. The shaft provides an interface to the blade for a user and can be used to create a lever force when scooping up material. The shaft is also used to support the materials during transportation. The shaft may also include a handle region for a user's hand. The shaft may include multiple components to facilitate collapsibility, such as interesting, telescoping, etc. for improved portability purposes.

The ability to collapse a snow shovel into a low profile configuration is a critical component of itsportability. The collapsible system of a portable snow shovel creates an extended state for operation and a collapsed state for storage. It is advantageous to be able to collapse the components to a maximal degree. Conventional collapsible systems fail to optimize the reduction in shaft length for maximal collapsibility. Therefore, there is a need in the industry for a snow shovel system that overcomes the disadvantages of the prior art by incorporating an improved collapsing system.

SUMMARY OF THE INVENTION

The present invention relates to portable snow shovel systems. One embodiment of the present invention relates to a snow shovel system with an extended and a collapsed state. The system includes a blade member, handle, lower shaft member, and upper shaft member. One end of the lower shaft member is coupled to the blade member, and the other is slidably coupled with the upper shaft member. A first end of the upper shaft member is coupled to a handle, and the second end is slidably coupled with the lower shaft member. The slidable coupling between the lower and upper shaft members includes an extended state and a collapsed state in which the handle is separated from the blade member by a greater distance in the extended state. The collapsed state includes translating a portion of the lower shaft member beyond the first end of the upper shaft member.

Embodiments of the present invention represent a significant advance in the field of portable snow shovel systems. Conventional portable translation-type snow shovel systems fail to collapse beyond the length of the shaft members because the translation mechanisms are only permitted to overlap within one another. Embodiments of the present invention provide a novel mechanism by which the collapsibility ratio of the system is increased by permitting the shaft members to translate beyond one another into a region of the handle. In addition, increasing the total collapsibility ratio may facilitate manufacturing the system for improved shovel operation during snow sport activities. For example, by increasing the available collapsibility ratio, the extended configuration length may be increased to improve shovel performance in the extended state while maintaining the necessary collapsed state dimension for portability.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

The following description of the invention can be understood in light of the Figures, which illustrate specific aspects of the invention and are a part of the specification. Together with the following description, the Figures demonstrate and explain the principles of the invention. In the Figures, the physical dimensions may be exaggerated for clarity. The same reference numerals in different drawings represent the same element, and thus their descriptions will be omitted.

DETAILED DESCRIPTION OF THE INVENTION

The present invention relates to portable snow shovel systems. One embodiment of the present invention relates to a snow shovel system with an extended and a collapsed state. The system includes a blade member, handle, lower shaft member, and upper shaft member. One end of the lower shaft member is coupled to the blade member and the other is slidably coupled with the upper shaft member. A first end of the upper shaft member is coupled to a handle and the second end is slidably coupled with the lower shaft member. The slidable coupling between the lower and upper shaft members includes an extended state and a collapsed state in which the handle is separated from the blade member by greater distance in the extended state. The collapsed state includes translating a portion of the lower shaft member beyond the first end of the upper shaft member. Also, while embodiments are described in reference to a snow shove system, it will be appreciated that the teachings of the present invention are applicable to other areas including but not limited to other translatable system.

The following terms are defined as follows:

Internested—a configuration between two members in which one member is disposed within the other.

Collapsed state—an operational state in which the upper and lower shaft members are slidably internested in a lengthwise orientation to facilitate portability.

Extended state—an operational state in which the upper and lower shaft members are slidably extended from one another to facilitate optimal functionality.

Figure 1:
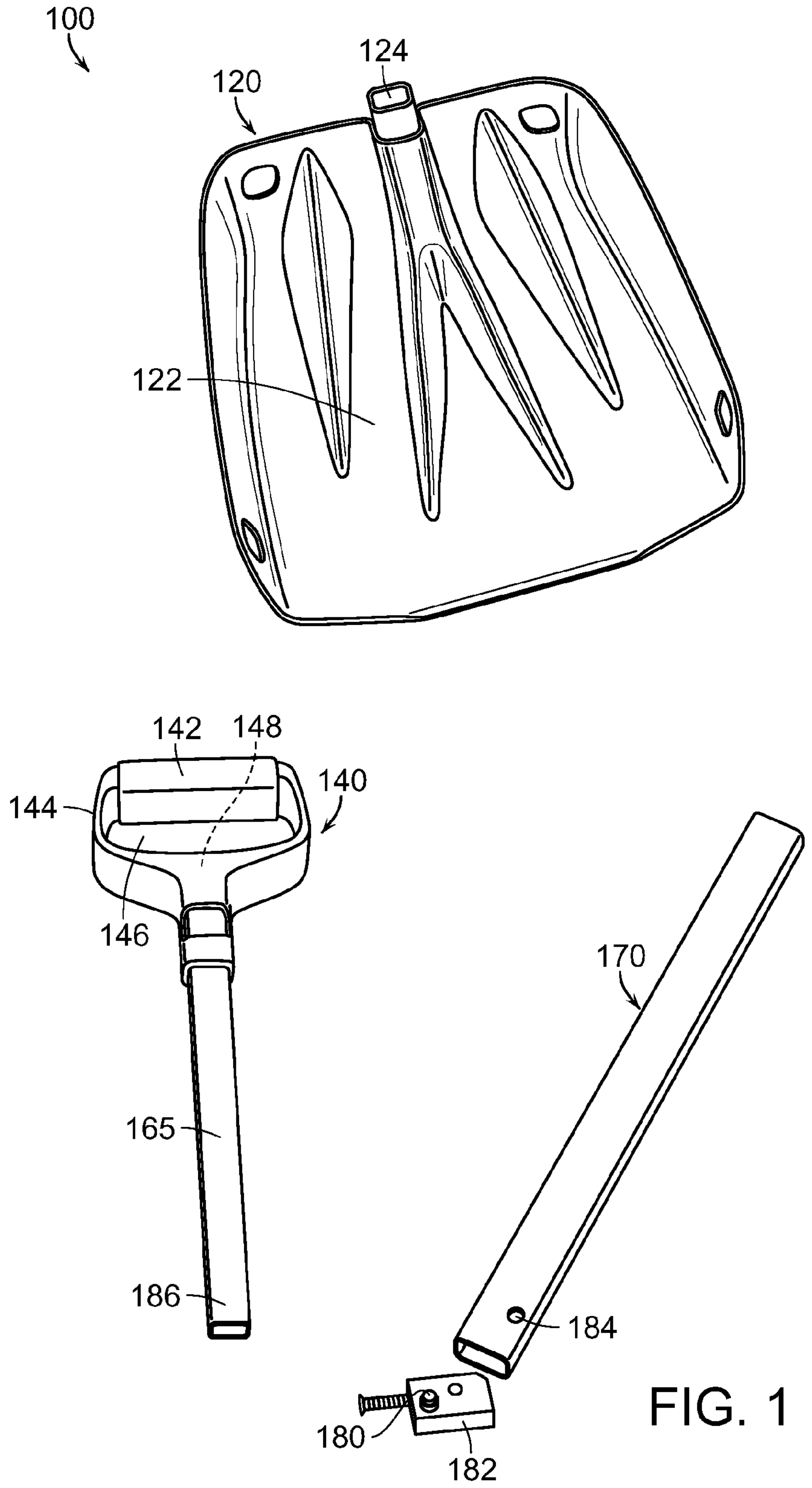
FIG. 1 illustrates a disassembled extendable snow shovel system with a handle in accordance with embodiments of the present invention.

Reference is initially made to FIG. 1, which illustrates a disassembled view of a portable snow shovel system, designated generally at 100. The system 100 includes a handle 140, an upper shaft member 165, a lower shaft member 170, and a blade member 120. The handle 140 further includes a grip 142, a frame 144, an internal region 146, and a recess 148. The internal region 146 is enclosed by the grip 142, the frame 144, and the recess 148. The handle 140 is generally D-shaped. The handle 140 components will be described in more detail with reference to FIG. 2-5. The handle 140 may be fixably coupled over a first end of the upper shaft member 165 as shown. It will be appreciated that the handle 140 and upper shaft member 165 may also be integrally fabricated as a single component. The upper shaft member 165 is an elongated shaped member having two ends and a particular cross sectional shape. The lower shaft member 170 is also an elongated shape member having two ends and a cross sectional shape corresponding to the upper shaft member 165. The lower shaft member 170 is configured to translate or slide within the upper shaft member 170, thereby forming a slidable coupling therebetween. One end of the lower shaft member 170 is coupled with the blade member 120, and a second end is slidably coupled with the upper shaft member 165. In particular, the lower shaft member 170 is internested within the upper shaft member 165 to facilitate the slidable coupling. In addition, the slidable coupling between the upper and lower shaft members 165, 170 enables the selection between extended (FIGS. 2-3) and collapsed (FIGS. 4-5) configurations or states of the system 100. The blade member 120 includes a coupler 124 and a surface region 122. The blade member 120 may be releasably or fixably coupled to the lower shaft member 170. A coupler assembly 182 is positioned within an end of the lower shaft member 170 including a spring biased pin 180 configured to extend through a pin recess 184. The pin recess 184 is disposed on the lower shaft member 170 at a location that is substantially lengthwise opposite to the blade member 120. A second pin recess 186 is disposed on the upper shaft member 165 at a location that is substantially lengthwise opposite of the handle 140.

Figure 2:
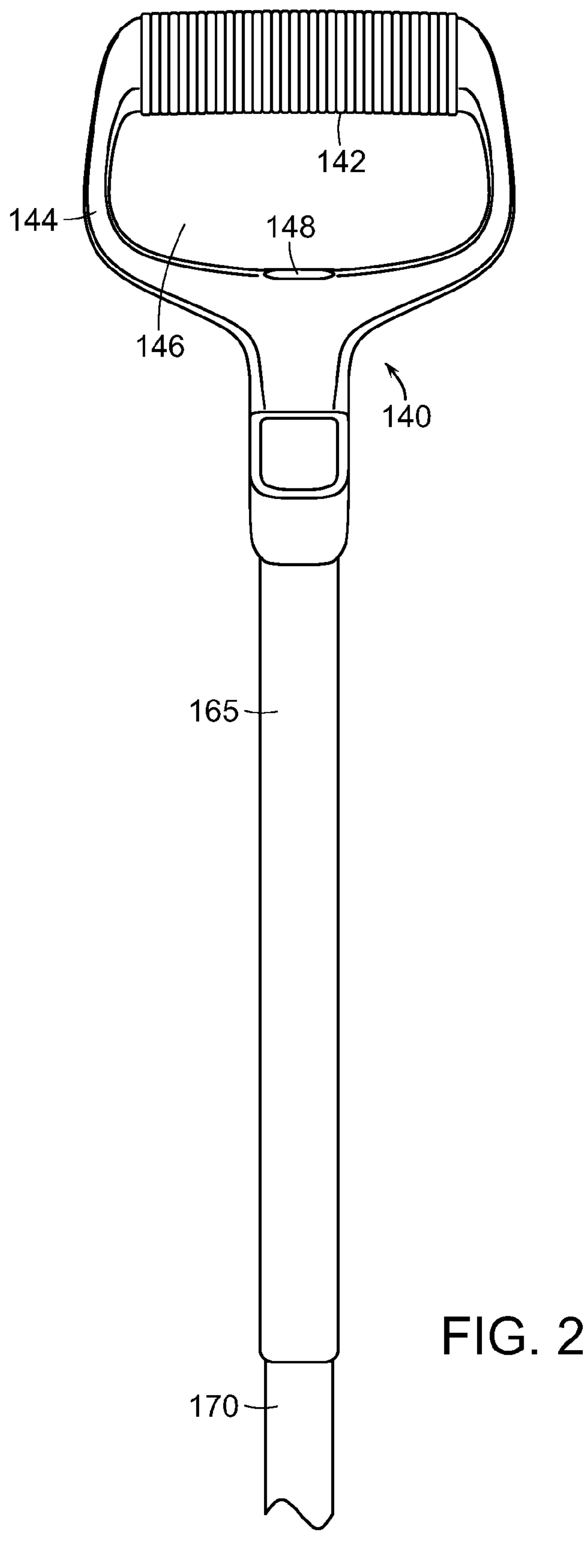
FIG. 2 illustrates a frontal view of the snow shovel system of FIG. 1 in an extended configuration.
Figure 3:
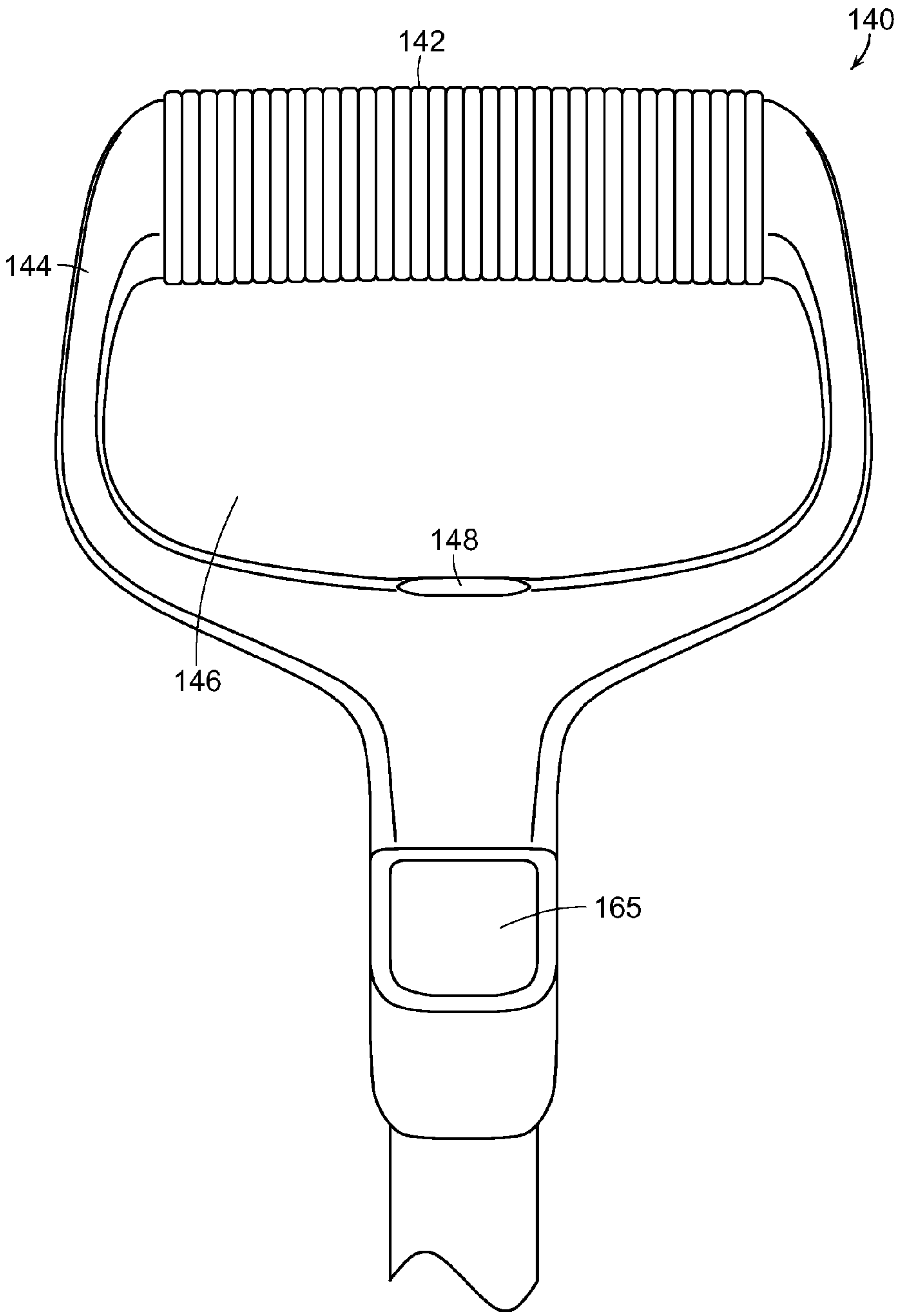
FIG. 3 illustrates a detailed view of the handle region of the snow shovel system of FIG. 1 in an extended configuration.

Reference is next made to FIGS. 2-3, which illustrate detailed views of the handle 140 and upper shaft member 165 in the extended configuration. The extended configuration includes separating the handle 140 from the blade member 120 greater than the collapsed configuration. The extended configuration is intended to optimize shovel performance. The extended configuration may also include a releasable coupling between the lower shaft member 170 and the upper shaft member 165 so as to prevent translation. The lower shaft member 170 includes an internally disposed coupler assembly 182. The coupler assembly 182 includes a spring biased coupling pin 180 extending through a pin recess 184 on the lower shaft member 170. The translation of the lower shaft member 170 with respect to the upper shaft member 165 will also cause the coupling pin 180 to align and extend through the second coupling recess 186 disposed on the upper shaft member 165. The extension of the coupling pin 180 through both the pin recess 184 and the second pin recess 186 will releasably couple the upper and lower shaft members 165, 170 in the extended configuration to permit shoveling operation without translation.

Figure 4:
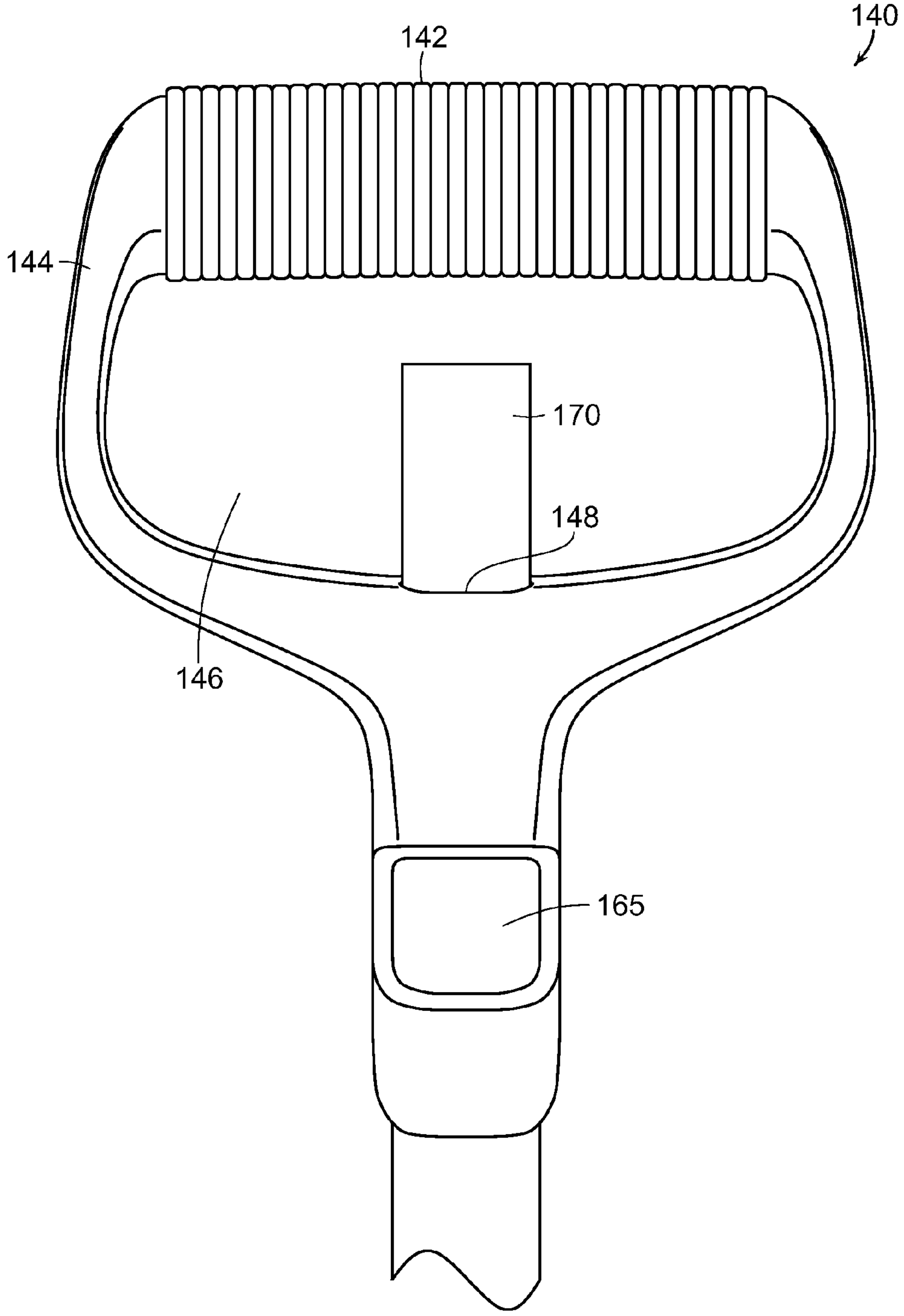
FIG. 4 illustrates a detailed view of the handle region of the snow shovel system of FIG. 1 in a collapsed configuration.
Figure 5:
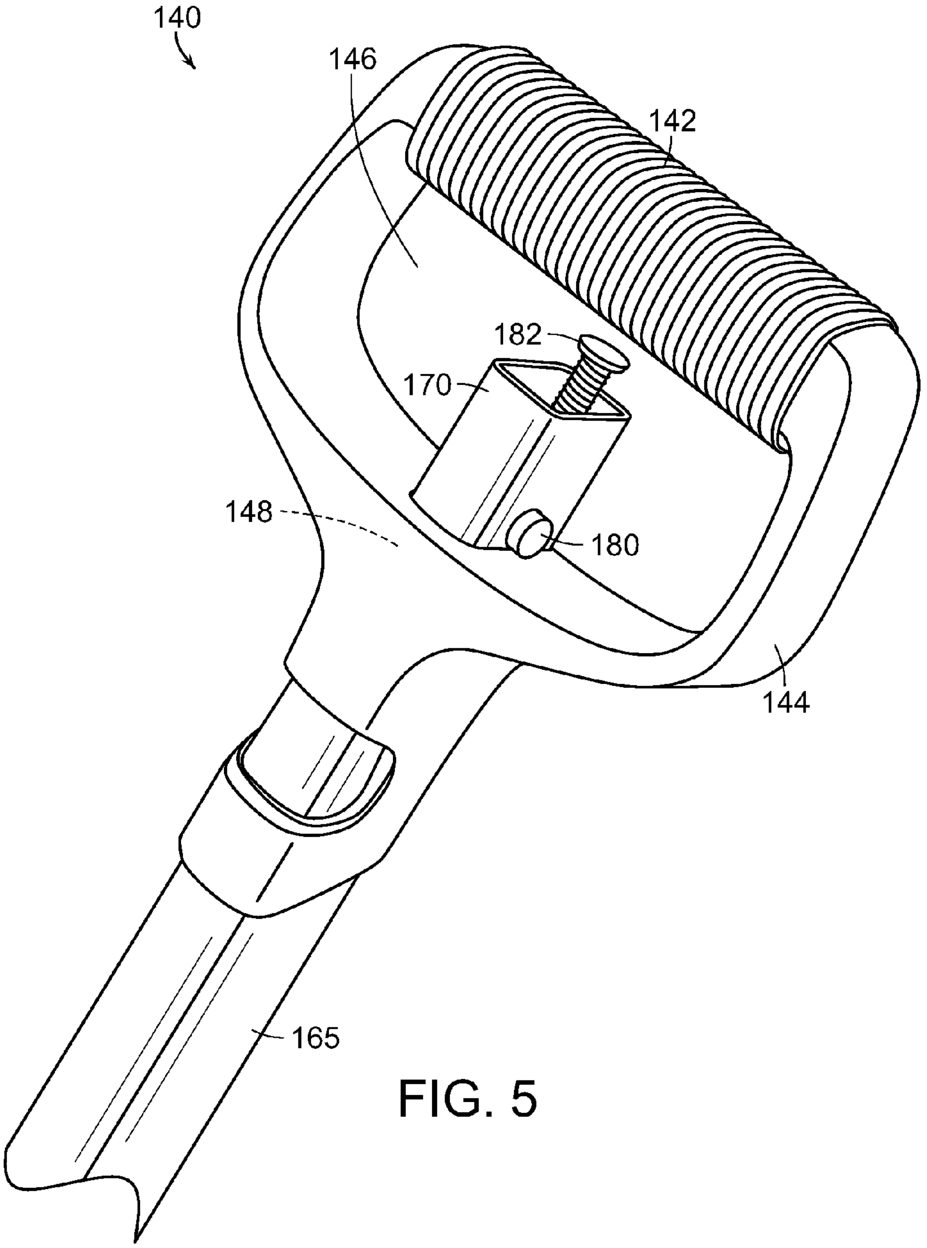
FIG. 5 illustrates a perspective view of the handle region of the snow shovel system of FIG. 1 in a collapsed configuration.

The illustrated handle 140 is may be referred to as D-shaped because it includes an enclosed internal region 146 and a partially curved outer frame 144. It will be appreciated that the handle 140 may also be referred to as O-Shaped or Rectangular-shaped. The recess 148 is disposed over an end of the upper shaft member 165. The recess 148 may be shaped to correspond to the internal cross-sectional shape of the upper shaft member 165 and the outer cross-sectional shape of the lower shaft member 170. The relative shape of the recess 148 thereby prevents the upper shaft member 165 from translating within the internal region 148 of the handle 140 in the illustrated extended state. However, the internal cross-sectional shape of the upper shaft member 165 corresponds to the external cross-sectional shape of the lower shaft member 170, thereby permitting the lower shaft member 170 to translate through the recess 148 in the collapsed state (FIGS. 4-5). The illustrated handle 140 further includes a coupling region of the frame 144 extending over a portion of the upper shaft member 165. The coupling region may be fixably coupled with the upper shaft member via one or more schemes, including but not limited to chemical adhesion, geometrical locking, over-molding, extension tabs, etc. The illustrated coupling region of the frame 144 includes an opening through which extension tabs may be extended from the upper shaft member 165 to the handle 140, thereby securing the coupling therebetween.

Reference is next made to FIGS. 4-5, which illustrates detailed views of the handle 140, lower shaft member 170, and upper shaft member 165 in a collapsed configuration. The collapsed state generally includes translating the handle member 120 (not shown) toward the handle 140 to improve portability of the overall system 100. The lower shaft member 170 is internested within the upper shaft member 165 to facilitate the slidable translation between the extended and collapsed states. In the collapsed state, a portion of the lower shaft member 170 is translated beyond the first end of the upper shaft member 165, through the recess 148 and into the internal region 146, thereby optimizing the collapsibility ratio of the system. The collapsibility ratio may refer to the overall length of the system in the collapsed versus extended configurations. As discussed above, the cross-sectional shapes of the upper shaft member 165, lower shaft member 170, and recess 148 are specifically selected to permit the illustrated configuration. In particular, the lower shaft member 170 includes an external cross section shape that corresponds to an internal cross-sectional shape 165 of the upper shaft member 165, so as to permit the translation therebetween. The recess 148 includes a cross-sectional opening shape corresponding to the lower shaft member 170. The translation from the extended state (FIGS. 2-3) to the collapsed state (FIGS. 4-5) may include releasing and engaging one or more releasable couplings between the lower and upper shaft members 170, 165. For example, the coupling pin 180 (discussed above) of the coupling assembly 182 may be depressed through the second pin recess 186 in the upper shaft member 165 to permit translation from the extended state. Likewise, as the portion of the lower shaft member 170 is translated beyond the first end of the upper shaft member 165 and through the recess 148, the coupling pin 180 may automatically extend from the pin recess 184 of the lower shaft member 170 within the internal region 146 of the handle (FIG. 5). The coupling pin 180 thereby releasably engages the positioning of the lower and upper shaft members 170, 165 in the collapsed configuration.

In operation, the snow shovel system 100 may be transitioned from the extended to collapsed states by the user to improve portability by performing a series of acts. The acts of collapsing the system 100 may include depressing the coupling pin 180 and translating the lower shaft member 170 within the upper shaft member 165 (blade member 120 toward the handle 140) such that a portion of the lower shaft member 170 extends beyond the upper shaft member 165. Likewise, the snow shovel system 100 may be transitioned from the collapsed to extended states by the user to improve shovel function by performing a series of acts. The acts of extending the system 100 may include depressing the coupling pin 180 and translating the lower shaft member 170 out of the upper shaft member 165 (blade member 120 away from the handle 140). The translation of the lower shaft member 170 will eventually cause the pin recess 184 of the lower shaft member 170 to align with the pin recess 186 of the upper shaft member 165 thereby allowing the spring biased pin coupler 180 to extend through both recesses 184, 186 and releasably engage the relative positioning of the upper and lower shaft members 165, 170.

It should be noted that various alternative system designs may be practiced in accordance with the present invention, including one or more portions or concepts of the embodiment illustrated in FIG. 1 or described above. Various other embodiments have been contemplated, including combinations in whole or in part of the embodiments described above.

What is claimed is:

1. A collapsible snow shovel system comprising:
- a blade member;
- a handle;
- a lower shaft member including one end coupled to the blade member;
- an upper shaft member including a first end and a second end, wherein the first end is coupled to a handle and the second end is slidably coupled with the lower shaft member;
- wherein the slidable coupling between the lower and upper shaft members includes an extended state and a collapsed state; and
- wherein the slidable coupling between the lower and upper shaft members includes internesting the lower shaft member within the upper shaft member, and wherein the collapsed state includes extending a portion of the lower shaft member beyond the first end of the upper shaft member.

2. The system of claim 1, wherein the handle further includes a grip, a frame, and an internal region enclosed between the grip, frame, and first end of the upper shaft member, and wherein the collapsed state includes extending the portion of the lower shaft member within the internal region.

3. The system of claim 1, wherein the handle further includes a recess disposed over the first end of the lower shaft member, and wherein the collapsed state includes extending the portion off the lower shaft member through the recess.

4. The system of claim 1, wherein the upper and lower shaft members include a rectangular cross sectional shape.

5. The system of claim 1, wherein the handle and upper shaft member are integral.

6. The system of claim 1, wherein the lower shaft member includes a coupler assembly, coupler pin, and a pin recess disposed in substantial proximity to an end opposite the blade member, and wherein the collapsed state includes extending the coupling pin through the pin recess external of the lower shaft member beyond the first end of the upper shaft member.

7. The system of claim 6, wherein the pin recess is disposed on the lower shaft member at a lengthwise location substantially opposite of the blade member.

8. The system of claim 1, wherein the lower shaft member includes a coupler assembly, coupler pin, and a pin recess disposed in substantial proximity to an end opposite the blade member, and wherein the extended state includes extending the coupling pin through the pin recess and through a second pin recess in the upper shaft member.

9. The system of claim 8, wherein the second pin recess is disposed on the upper shaft member at a lengthwise location that is substantially opposite of the handle.

10. The system of claim 1, wherein the blade member is releasably coupled to the lower shaft member.

11. The system of claim 1, wherein the handle is a D-shaped handle.

12. The system of claim 1, wherein the extended state includes separating the handle from the blade member a distance greater than the collapsed state.

13. The system of claim 1, wherein the slidable coupling between the lower shaft member and the upper shaft member includes internesting one end of the lower shaft member within the upper shaft member.

14. A collapsible snow shovel system comprising:
- a blade member;
- a handle including a grip, a frame, and an internal region enclosed between the grip, frame, and first end of the upper shaft member;
- a lower shaft member including one end coupled to the blade member;
- an upper shaft member including a first end and a second end, wherein the first end is fixably coupled to a handle and the second end is slidably coupled with the lower shaft member;
- wherein the slidable coupling between the lower and upper shaft members includes an extended state and a collapsed state; and
- wherein the slidable coupling between the lower and upper shaft members includes internesting one end of the lower shaft member within the upper shaft member, and wherein the collapsed state includes extending the lower shaft member within the internal region.

15. A method for collapsing a snow shovel system from an extended state to a collapsed state including the acts of:
- providing a blade member;
- providing a handle;
- providing a lower shaft member including one end coupled to the blade member;
- providing an upper shaft member including a first end and a second end, wherein the first end is fixably coupled to a handle and the second end is slidably coupled with the lower shaft member;
- translating the blade member toward the handle; and
- translating a portion of the lower shaft member beyond the first end of the upper shaft member.

16. The method of claim 15, wherein the act of translating the blade member toward the handle further includes translating the lower shaft member within the upper shaft member.

17. The method of claim 15, wherein the act of translating a portion of the lower shaft member beyond the first end of the upper shaft member further includes translating the portion of lower shaft member through a recess of the handle.

18. The method of claim 15, wherein the act of translating the blade member toward the handle further includes depressing a coupling pin extending through a second pin recess of the upper shaft member.

19. The method of claim 15, wherein the act of translating a portion of the lower shaft member beyond the first end of the upper shaft member further includes extending a coupling pin through a pin recess of the lower shaft member beyond the upper shaft member.

20. The method of claim 15, wherein the handle further includes a grip, a frame, and an internal region enclosed by the grip, frame, and first end of the upper shaft member, and wherein the act of translating a portion of the lower shaft member beyond the first end of the upper shaft member includes disposing the portion of the lower shaft member within the internal region.

* * * * *